Patented Jan. 20, 1931

1,789,658

UNITED STATES PATENT OFFICE

MAX METH, OF PITTSBURGH, PENNSYLVANIA, ASSIGNOR TO ISAAC R. STEWART, OF NEW YORK, N. Y.

GLASS AND METHOD OF MAKING

No Drawing. Application filed February 4, 1927. Serial No. 166,024.

The present invention relates to glass compositions and more particularly to a glass having a relatively low coefficient of expansion and a relatively high tensile strength, and method of making same.

Since glass is a relatively poor conductor of heat, changes in temperature at one point do not materially affect the temperatures of adjoining portions. The local expansion occasioned by non-uniform heating produces internal stresses which, due to the hard brittle nature of glass, cause breakage. This is particularly true where the changes in temperature are rapid and where the coefficient of expansion is relatively high. Other things being equal, the higher the coefficient of expansion, the greater the tendency of the glass to crack or break under rapid changes in temperature. The reason for this is that the local expansion tends to elongate the adjacent portions.

Attempts have been made to reduce the coefficient of expansion by increasing the silica content of the glass. This requires a material increase in the operating temperature of the glass furnace which is difficult to obtain with present fuel and equipment. Further such an increase of silica must be made by a reduction of the percentage of other constituents which occasions difficulties in manufacture, thereby rendering this method very objectionable.

Attempts have also been made to reduce the coefficient of expansion by changing the constituents of the glass but no change proposed so far has given satisfactory results without increasing the cost of the glass to a point where it cannot be used commercially.

The present invention eliminates the difficulties enumerated above and is the result of the discovery of exceptional results attained by a very inexpensive element which not only reduces the coefficient of expansion but also increases the tensile strength and quality of the glass without introducing other complications. Further the quantity required is so small that it does not materially disturb the usual proportions of the basic ingredients.

An object of the invention is to reduce the coefficient of expansion of commercial glass sufficiently substantially to eliminate breakage due to local changes in temperature.

Another object of the invention is the reduction of the coefficient of expansion by the addition of an inexpensive element such as beryllium or its equivalent to the constituents of the glass.

Another object of the invention is to increase the tensile strength of glass by the addition of an inexpensive element such as a beryllium compound to the constituents thereof.

Another object of the invention is to decrease the coefficient of expansion and to increase the tensile strength of glass without materially increasing its cost.

A further object of the invention is to better the quality of glass by the addition of small quantities of a beryllium compound to the constituents thereof in their unfused state.

Other and further objects of the invention will be obvious upon an understanding of the illustrative embodiment about to be described; and many advantages other than those referred to herein, will occur to one skilled in the art upon employment of the invention in practice.

While the ingredients and proportions thereof in glass may be varied over wide ranges, a simple illustrative glass for the purposes of this description may be 74% silica ($SiO_2$), 16% soda ($Na_2O$), and 9% lime ($CaO$). The composition may contain other elements in small quantities for the purpose of coloring and the like. The coefficient of expansion of a glass of this character is about $7 \times 10^{-6}$. The glass chosen and the ingredients and proportions thereof are merely illustrative and are not intended to limit the present invention, which is applicable also to other forms of glass.

I have discovered that by the addition of small quantities of oxide or other beryllium compound to commercial glass the coefficient of expansion may be materially decreased and the tensile strength thereof may be materially increased. An addition of as much as one per cent of beryllium will reduce the coefficient of expansion by half and the addition of a higher percentage of beryllium will reduce the coefficient of expansion to such an extent that it is negligible and a non-breakable glass is formed in so far as changes in temperature are concerned.

Beryllium in its pure state is difficult to obtain and fuses at high temperatures. However, beryllium in its commercial state containing about 66% of silica, about 20% of aluminum and about 14% beryllium, will fuse at ordinary glass furnace temperatures, and can be obtained at a relatively low cost without difficulty. Since silica is one of the constituents of glass, its addition is immaterial so long as the portion added is accounted for; likewise since aluminum is a substitute known in the art for lime its addition also is a benefit rather than a hindrance.

An illustrative batch of material for the production of glass is 1,000 pounds of sand, 380 pounds of soda, and 120 pounds of lime. This produces a glass having a silica, soda, and lime content of about 74%, 16%, and 9%, respectively. A similar batch with sufficient commercial beryllium added thereto to produce one per cent of beryllium in the contents would be about 944 pounds of sand, 380 pounds of soda, 100 pounds of lime and 100 pounds of commercial beryllium. The 66 pounds of silica in the 100 pounds of commercial beryllium raise the silica content to 1,000 pounds noted above. The 20 pounds of aluminum in the 100 pounds of commercial beryllium bring the equivalent lime content to 120 pounds. The 14 pounds of beryllium in the beryllium mixture give about one per cent of beryllium. It will be understood of course, that the amounts noted are approximate only, and that changes in the proportions of the contents within the wide range of commercial variations, will not affect the present invention.

The addition of beryllium in the quantities noted does not materially increase or change the required conditions in the glass furnace. Further, beryllium as mined commercially is relatively inexpensive and does not materially increase the cost of glass. On the other hand the use of the beryllium greatly increases the ability of the glass to withstand rapid changes in temperature and also greatly increases the quality and tensile strength thereof. Experiments show that as much as one-half of one per cent of beryllium is equally effective in increasing the quality of the glass and in decreasing the coefficient of expansion as an increase of 4% in the silica content and a greater increase in the percentage of beryllium will give a proportionately greater increase in the quality of the glass and a proportionately greater decrease in the coefficient of expansion, without introducing the complications occasioned by an increase of the silica content.

It will be seen that a high quality glass with a low coefficient of expansion and a high tensile strength has been provided at a low cost. The glass may be manufactured with present apparatus and without necessitating changes in temperatures of the glass furnaces. The method employed is simple and effective, and readily applicable under existing conditions in glass manufacturing plants.

As various changes can be made in the proportions of the ingredients enumerated above and as various equivalents may be substituted for those named without departing from the spirit of the present invention, it is desired that the above description be understood as illustrative and not in a limiting sense.

Having thus described my invention, I claim:

1. A glass having a relatively low coefficient of expansion comprising usual constituents of soda, lime, silica glass with a small percentage of a beryllium compound therein.

2. A glass containing silica, lime, soda, and a beryllium compound.

3. A glass formed from silica, lime, soda, alumina, and less than five per cent of a beryllium compound.

4. A glass containing silica, lime, and soda in suitable proportions for commercial glass with a beryllium compound therein to reduce the coefficient of expansion of the glass.

5. A composition comprising silica, lime, and soda in suitable proportions and less than 5% of a beryllium compound therein to decrease the coefficient of expansion and to increase the tensile strength thereof.

6. A glass comprising about 74% silica, 16% lime, about 9% soda and about 1% of a beryllium compound.

7. A composition for forming glass comprising about 74% silica, about 16% lime, about 9% soda and a small percentage of a beryllium compound added thereto to decrease the coefficient of expansion thereof.

8. The method of making soda, lime, silica glass, which comprises adding a quantity of a beryllium compound not exceeding 5% to an unfused batch of glass making materials, and then fusing the mixture.

9. As an article of manufacture, glass containing silica, lime, soda, alumina and a beryllium compound.

10. A glass resulting from the fusion of a batch comprising soda, lime, silica and a quantity of beryllium compound, not exceeding five per cent.

11. A glass having a low coefficient of expansion resulting from the fusion of a batch comprising soda, lime, silica, and a quantity of a beryllium compound.

MAX METH.